D. T. PLATT.
DINNER-PAIL AND LANTERN.
No. 180,918. Patented Aug. 8, 1876.
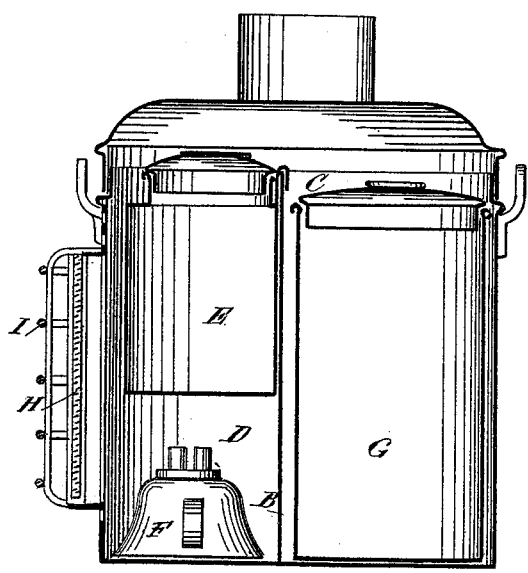
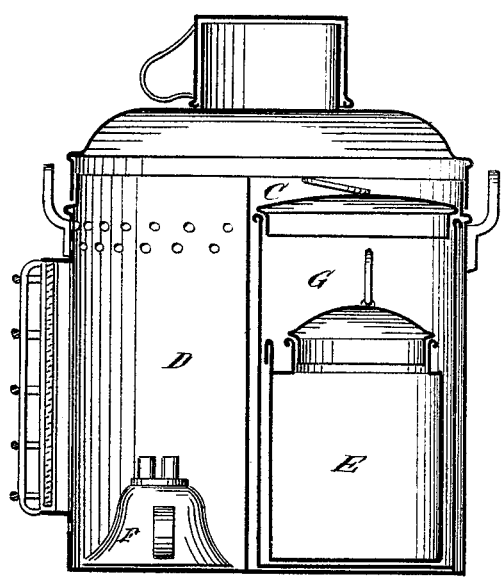
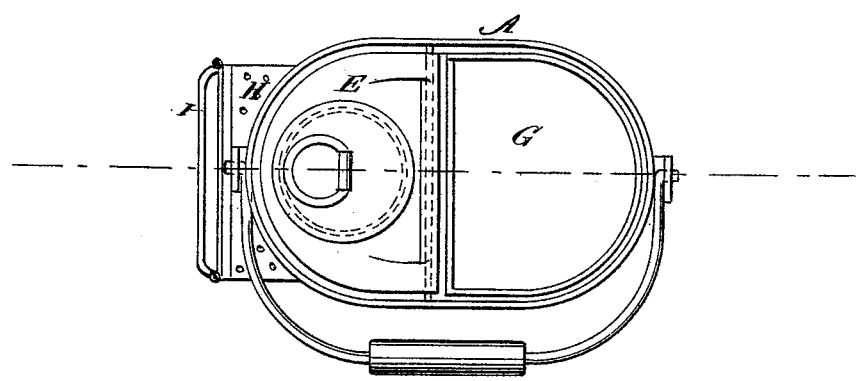
WITNESSES:
C. Neveux
John Goethals
INVENTOR
David T. Platt
BY
[signature]
ATTORNEYS.

UNITED STATES PATENT OFFICE.

DAVID T. PLATT, OF GREENWICH, CONNECTICUT.

IMPROVEMENT IN DINNER-PAIL AND LANTERN.

Specification forming part of Letters Patent No. 180,918, dated August 8, 1876; application filed May 1, 1876.

*To all whom it may concern:*

Be it known that I, DAVID T. PLATT, of Greenwich, Fairfield county, Connecticut, have invented a new and Improved Combined Dinner-Pail and Lantern, of which the following is a specification:

My invention consists of a dinner-pail with a compartment for heating tea and coffee, contrived to serve for a lantern for the workman going home at night.

Figure 1 is a sectional elevation of my improved dinner-pail and lantern, taken on line $x\,x$, Fig. 3, showing the pail adjusted for heating coffee. Fig. 2 is a similar section, showing it adjusted for the lantern, and Fig. 3 is a top view, the cover removed.

A is the pail, which is separated in two compartments, C D, by the partition B, in one of which is a large can, G, for the edible portion of the dinner, and in the other is the smaller can E for coffee, and a lamp, F, below for heating it, and the front side of this compartment is made of glass or other transparent substance H, and has a protecting-frame, I, to show the light through. The can E is set in can G, when the light of the lamp is to be used.

Having thus described my invention, I claim as new and desire to secure by Letters Patent—

The combination, with lamp and double-chambered dinner-pail having transparent front, of a detachable cooking-can, E, adapted to be supported within either of the two compartments, as and for the purpose specified.

DAVID T. PLATT.

Witnesses:
J. HENRY GILBERT,
GEORGE H. HAIGHT.